Sept. 6, 1932.  P. W. LEHMAN  1,876,252
DEVICE FOR HANDLING MOLDS
Filed Oct. 24, 1930   2 Sheets-Sheet 1

INVENTOR
PAUL W. LEHMAN
BY Chapin C Neal
ATTORNEYS

Sept. 6, 1932.   P. W. LEHMAN   1,876,252
DEVICE FOR HANDLING MOLDS
Filed Oct. 24, 1930   2 Sheets-Sheet 2
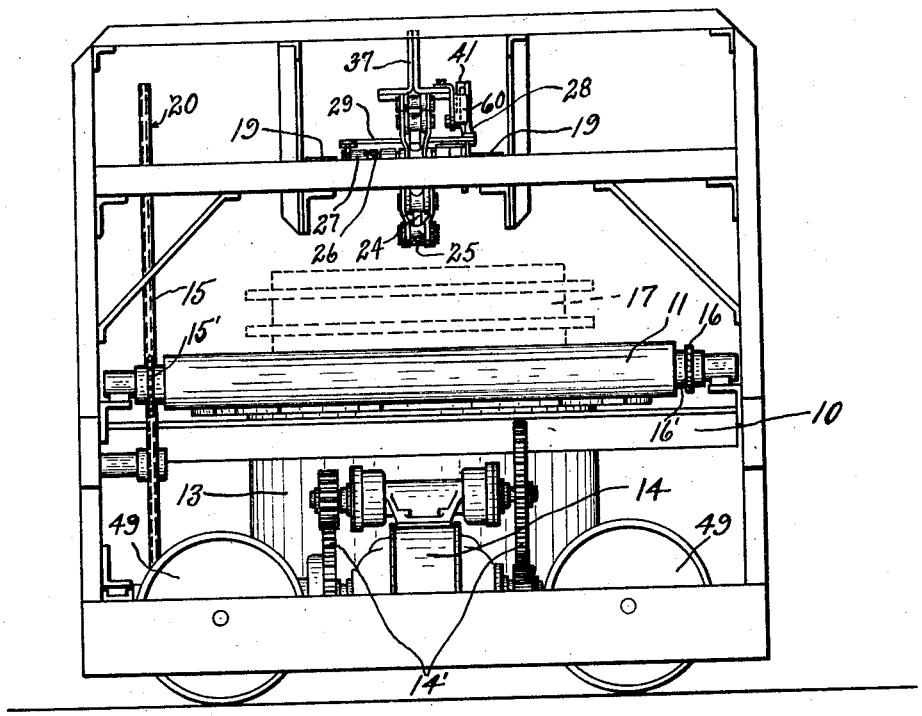
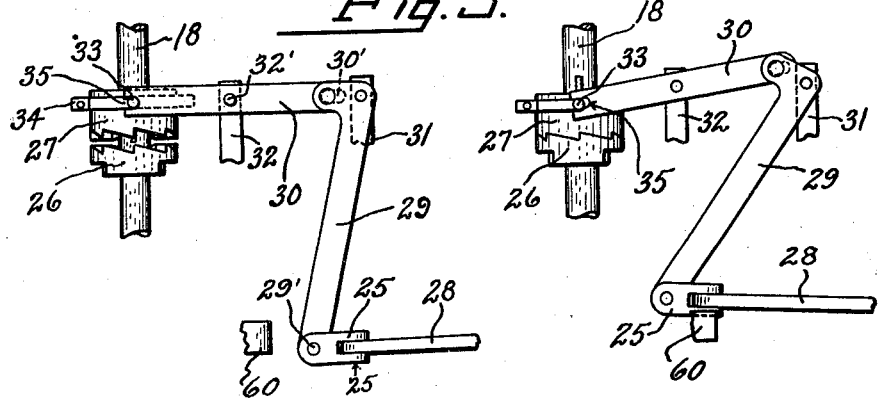
INVENTOR.
BY PAUL W. LEHMAN
ATTORNEYS Patented Sept. 6, 1932

1,876,252

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

DEVICE FOR HANDLING MOLDS

Application filed October 24, 1930. Serial No. 490,963.

My invention relates to an apparatus for handling loaded tire molds between the vulcanizing heaters and a mold conveyor.

One object of the invention is to provide a power driven machine which is semi-automatic in operation resulting in a saving of time and labor and removing some of the hazards in handling the molds.

Other and further objects will be apparent from the following specification and claims.

In the accompanying drawings which illustrate one embodiment of my invention,

Fig. 3 is a rear view of the apparatus; and

Figs. 4 and 5 are detail views of the driving clutch and its operating linkage.

Figure 1:
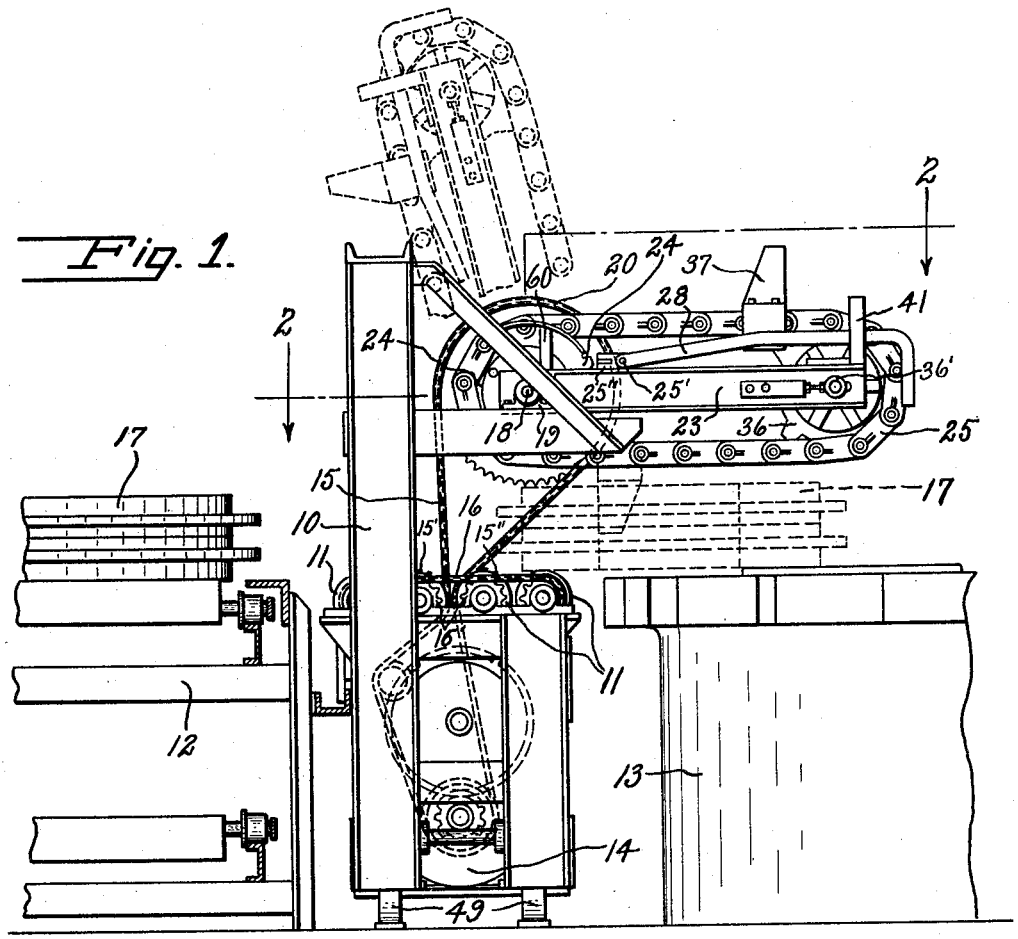
Fig. 1 is a side view of the apparatus showing its position in relation to a conveyor and a heater.

Referring to the drawings, 10 designates the frame of the machine which forms a carriage and is provided with wheels 49 to permit the device to be moved along between the conveyor 12 and heaters 13 as shown in Fig. 1. Mounted in the frame 10 are a plurality of rollers 11 positioned at substantially the height of the conveyor 12 and the heater 13 and in effect bridging the gap between them. The rolls 11 are driven from a reversible motor 14, mounted on the lower part of the frame 10, through suitable reduction gearing 14' and sprocket chains 15 and 16, chain 15 engaging sprockets 15' and 15'' on the two center rolls and chain 16 engaging sprockets 16' on the opposite ends of the rolls.

Pivoted to the upper part of frame 10 is a frame 23 carrying means for drawing molds from the heaters. Frame 23 is freely pivoted on a hub 21 carried by a shaft 18 journaled in bearings 19 in frame 10. Shaft 18 is continuously driven from motor 14 by chain 15 through a sprocket 20 secured to one end of the shaft 18. Hub 21 is adapted to be driven with shaft 18 by a clutch, one member 26 of which is secured to the hub, the other member 27 being splined on shaft 18. A mold engaging lug 37 is secured to a chain 25 passing around a sprocket 24, secured, as later described, to hub 21, and a sprocket 36 journaled in adjustable bearings 36' carried by the free end of frame 23.

Clutch member 27 is moved into engagement with member 26 to drive chain 25 by a hand lever 28, held in guides 41 and pivoted for vertical movement at 25' to a block 25'', the latter being horizontally pivoted at 29' to a bellcrank 29 pivoted at 31' to a bracket 31 secured to frame 23. The short arm of bellcrank 29 is pivoted by a slotted connection 30' to a lever 30 pivoted at 32' to a bracket 32 carried by the frame 23. The opposite end of lever 30 is provided with a slot 35 engaging pin 33 fixed to a shifting collar 34 operatively connected to clutch member 27.

Figure 2:
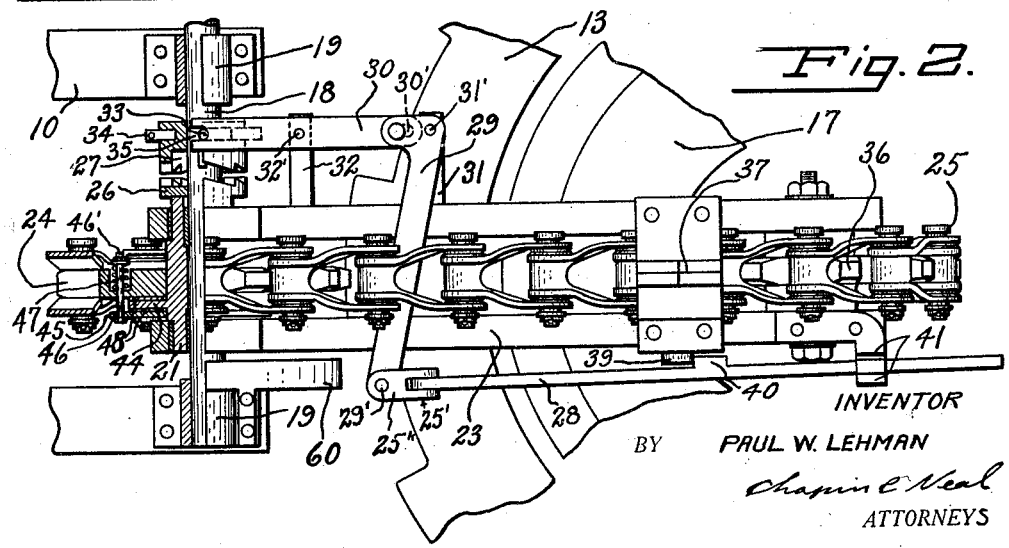
Fig. 2 is a view taken substantially on line 2—2 of Fig. 1.

The chain 25 is automatically stopped after one revolution of the mold engaging lug 37, by means of a roller 39, carried by the lug 37, which engages a lug 40 (best shown in Fig. 2) formed on lever 28 to draw the latter to the right as shown in Fig. 2 to disengage the clutch.

In order to prevent possible breakage of the parts the sprocket 24 is frictionally secured to hub 21 by a plate 45 drawn against a flange 44, formed on hub 21, by springs 47 surrounding bolts 46 which secure plate 45 to the sprocket 24. As will be obvious the pressure exerted by plate 45 on flange 44 may be adjusted by the nuts 46' which hold springs 47 on the bolts. Preferably fibre washers 48 are interposed between plate 45 and flange 44 and between the latter and sprocket 24.

The unloading operation is as follows: With the parts positioned as shown in Figs. 1 and 2, the ram of the heater 13 is raised to elevate a mold above the top of the heater to the level of rolls 11. Lever 28 is raised in guides 41, to free lug 40 of roll 39, and is then moved to the left as viewed in Figs. 1 and 2 to engage the clutch. As soon as roll 39 has advanced beyond lug 40 lever 28 is dropped back in place. Mold engaging lug 37 advances in a clockwise direction as viewed in Fig. 1 and engages within the annulus of the mold 17 to draw the mold onto rolls 11 as shown in dotted line in the latter figure. The rolls 11 carry the mold onto the conveyor 12 and lug 37 returning to initial position disengages clutch 26—27 by engagement of roll 39 with lug 40.

When the device is used to transfer molds to the heater from conveyor 12, the frame 23 is pivoted about shaft 18 to the dotted line position shown in Fig. 1. To prevent accidental engagement of the clutch 26—27 through possible displacement of lever 28 when frame 23 is swung to inoperative position an arcuate plate 60 is secured to frame 10 in position to engage the end of lever 29 adjacent pivot 29', thus preventing operative movement of lever 28. With the frame 23 in raised position motor 14 is reversed to drive rolls 11 in the direction of the heater and the molds, being shunted from the conveyor 12 to rolls 11 by any suitable means, such as a conventional shunt bar placed diagonally across the conveyor 12, are advanced by rolls 11 to position on the ram of the heater.

Having described one embodiment of my invention, I claim:

1. A device for handling molds which comprises a carriage adapted to be positioned intermediate a mold conveyor and a heater to substantially bridge the gap between the heater and the conveyor, means mounted on the carriage to selectively advance the molds toward or from the heater, means pivoted to said carriage, for movement to and from operative position, to move the molds from the heater onto the mold advancing means, and means to automatically stop said mold moving means after each cycle of operation.

2. A device for handling molds which comprises a carriage adapted to be positioned intermediate a mold conveyor and a heater, continuously driven rolls mounted on the carriage and positioned to substantially bridge the gap between the heater and the conveyor, a frame pivoted to the carriage and extending over the heater, a conveyor chain carried by said frame, a mold engaging lug carried by the chain to move a mold from the heater onto said rolls, means to drive said chain, and clutch means to automatically stop the chain after one cycle of travel.

3. A device for handling molds which comprises a carriage adapted to be positioned intermediate a mold conveyor and a heater, rolls mounted on the carriage and positioned to substantially bridge the gap between the heater and the conveyor, a shaft rotatably mounted on the carriage, a reversible motor driving the rolls and shaft, a frame pivoted on the shaft and extending over the heater, a sprocket rotatably mounted on the shaft, a clutch mechanism for operatively connecting the sprocket to the shaft, a second sprocket journaled in the free end of the frame, a chain passing around said sprockets, a lug secured to the chain and positioned to engage a mold and move it from the heater onto the rolls, and means carried by the lug to disengage said clutch upon completion of one cycle of travel of the chain.

PAUL W. LEHMAN.